US009742687B2

(12) United States Patent
Minakuchi et al.

(10) Patent No.: US 9,742,687 B2
(45) Date of Patent: Aug. 22, 2017

(54) MANAGEMENT SYSTEM AND METHOD FOR EXECUTION OF VIRTUAL MACHINES

(71) Applicant: FUJITSU LIMITED, Kawasaki-shi, Kanagawa (JP)

(72) Inventors: Yu Minakuchi, Yokohama (JP); Masahiko Ohashi, Nagoya (JP); Tomotaka Endo, Yokohama (JP); Yoji Nomura, Kawasaki (JP); Takaaki Kawakami, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 422 days.

(21) Appl. No.: 14/155,711

(22) Filed: Jan. 15, 2014

(65) Prior Publication Data

US 2014/0258540 A1   Sep. 11, 2014

(30) Foreign Application Priority Data

Mar. 6, 2013   (JP) .................................. 2013-043955

(51) Int. Cl.
  *G06F 15/173*   (2006.01)
  *H04L 12/911*   (2013.01)
  (Continued)

(52) U.S. Cl.
  CPC ............ *H04L 47/70* (2013.01); *G06F 9/5083* (2013.01); *G06F 9/5077* (2013.01); *G06F 2009/4557* (2013.01)

(58) Field of Classification Search
  CPC ... H04L 47/125; H04L 67/1008; H04L 65/80; H04L 47/70; G06F 9/45558; G06F 2009/4557
  (Continued)

(56) References Cited

U.S. PATENT DOCUMENTS 8,036,226 B1 * 10/2011 Ma .......................... H04L 45/00 370/235
2002/0059427 A1   5/2002 Tamaki et al.
(Continued)

FOREIGN PATENT DOCUMENTS

JP   2002-24192    1/2002
JP   2006-106859   4/2006
(Continued)

OTHER PUBLICATIONS

Extended European Search Report dated Jun. 4, 2014 in corresponding European Patent Application No. 14152385.2.
(Continued)

*Primary Examiner* — June Sison
*Assistant Examiner* — Kristoffer S Sayoc
(74) *Attorney, Agent, or Firm* — Staas & Halsey LLP

(57) ABSTRACT

A management system includes an information processing apparatus; a management apparatus; and a load balancing apparatus. And the management apparatus specifies a first processing entity that relates to a first application program whose performance is not guaranteed, upon detecting that a value related to a load of a second processing entity that relates to a second application program whose performance is guaranteed is equal to or greater than a first predetermined threshold, and requests the information processing apparatus to stop the first processing entity, and the information processing apparatus requests the load balancing apparatus to stop allocating processing to the first processing entity, stops the first processing entity upon detecting that a value related to a load of the first processing entity is equal to or less than a second predetermined threshold, and causes a third processing entity to start processing for the second application program.

6 Claims, 16 Drawing Sheets

(51) Int. Cl.
*G06F 9/50* (2006.01)
*G06F 9/455* (2006.01)

(58) Field of Classification Search
USPC .................................................. 709/226, 224
See application file for complete search history.

(56) References Cited

U.S. PATENT DOCUMENTS

| | | | |
|---|---|---|---|
| 2005/0108712 A1* | 5/2005 | Goyal | G06F 9/5083 718/100 |
| 2009/0293056 A1* | 11/2009 | Ferris | G06F 9/45533 718/1 |
| 2009/0300210 A1 | 12/2009 | Ferris | |
| 2011/0296019 A1* | 12/2011 | Ferris | G06F 9/5077 718/1 |

FOREIGN PATENT DOCUMENTS

| | | |
|---|---|---|
| JP | 2010-86145 | 4/2010 |
| JP | 2012-37935 | 2/2012 |
| WO | 2005/017783 | 2/2005 |

OTHER PUBLICATIONS

Chinese Office Action dated Oct. 8, 2016 in corresponding Chinese Patent Application No. 201410077092.3.
Japanese Office Action issued Jun. 21, 2016 in corresponding Japanese Application No. 2013-043955.

\* cited by examiner

FIG.5

| SERVER NUMBER | VIRTUAL MACHINE NUMBER | MEASUREMENT DATE | CPU UTILIZATION RATE [%] | MEMORY UTILIZATION RATE [%] | RESPONSE TIME [msec] |
|---|---|---|---|---|---|
| 1 | 1 | 2012/12/10 12:34:55 | 80 | 80 | 1600 |
| 1 | 2 | 2012/12/10 12:34:52 | 70 | 70 | 800 |
| 1 | 3 | 2012/12/10 12:34:54 | 80 | 80 | 1000 |
| ... | ... | ... | ... | ... | ... |

FIG.6

| SERVER NUMBER | VIRTUAL MACHINE NUMBER | CPU UTILIZATION RATE [%] | MEMORY UTILIZATION RATE [%] | RESPONSE TIME [msec] |
|---|---|---|---|---|
| 1 | 1 | 80 | 80 | 1600 |
| 1 | 2 | 70 | 70 | 800 |
| 1 | 3 | 80 | 80 | 1000 |
| ... | ... | ... | ... | ... |
| 1 | 11 | 60 | 60 | 500 |
| 1 | 12 | 70 | 70 | 300 |
| 1 | 13 | 40 | 30 | 150 |
| ... | ... | ... | ... | ... |

| THRESHOLD | | |
|---|---|---|
| CPU UTILIZATION RATE [%] | MEMORY UTILIZATION RATE [%] | RESPONSE TIME [msec] |
| 90 | 90 | 1500 |

FIG.8

| CONTRACTOR NUMBER | APL NUMBER | CONTRACT | SERVER NUMBER | VIRTUAL MACHINE NUMBER |
|---|---|---|---|---|
| 1 | 1 | GUARANTEED | 1 | 1 |
| 1 | 1 | GUARANTEED | 1 | 2 |
| 1 | 1 | GUARANTEED | 1 | 3 |
| ⋮ | ⋮ | ⋮ | ⋮ | ⋮ |
| 2 | 2 | BEST EFFORT | 1 | 11 |
| 2 | 2 | BEST EFFORT | 1 | 12 |
| 2 | 2 | BEST EFFORT | 1 | 13 |
| ⋮ | ⋮ | ⋮ | ⋮ | ⋮ |

FIG.9

| APL NUMBER | REPRESENTATIVE URI | APL LOCATION | VIRTUAL MACHINE NUMBER | DELETE FLAG |
|---|---|---|---|---|
| 1 | service/1 | service/APL/1 | 1 | |
| 1 | service/1 | service/APL/1 | 2 | |
| 1 | service/1 | service/APL/1 | 3 | |
| ⋮ | ⋮ | ⋮ | ⋮ | ⋮ |
| 2 | service/2 | service/APL/2 | 11 | |
| 2 | service/2 | service/APL/2 | 12 | |
| 2 | service/2 | service/APL/2 | 13 | |
| ⋮ | ⋮ | ⋮ | ⋮ | ⋮ |

FIG.11

| APL NUMBER | REPRESENTATIVE URI | APL LOCATION | VIRTUAL MACHINE NUMBER | DELETE FLAG |
|---|---|---|---|---|
| 1 | service/1 | service/APL/1 | 1 | |
| 1 | service/1 | service/APL/1 | 2 | |
| 1 | service/1 | service/APL/1 | 3 | |
| ⋮ | ⋮ | ⋮ | ⋮ | ⋮ |
| 2 | service/2 | service/APL/2 | 11 | |
| 2 | service/2 | service/APL/2 | 12 | |
| 2 | service/2 | service/APL/2 | 13 | DELETE |
| ⋮ | ⋮ | ⋮ | ⋮ | ⋮ |

FIG.12

| APL NUMBER | SERVER NUMBER | VIRTUAL MACHINE NUMBER |
|---|---|---|
| 1 | 1 | 1 |
| | 1 | 2 |
| | 1 | 3 |
| ⋮ | ⋮ | ⋮ |
| 2 | 1 | 11 |
| | 1 | 12 |
| | 1 | |
| ⋮ | ⋮ | ⋮ |

FIG.13

| APL NUMBER | REPRESENTATIVE URI | APL LOCATION | VIRTUAL MACHINE NUMBER | DELETE FLAG |
|---|---|---|---|---|
| 1 | service/1 | service/APL/1 | 1 | |
| 1 | service/1 | service/APL/1 | 2 | |
| 1 | service/1 | service/APL/1 | 3 | |
| ⋮ | ⋮ | ⋮ | ⋮ | ⋮ |
| 2 | service/2 | service/APL/2 | 11 | |
| 2 | service/2 | service/APL/2 | 12 | |
| 1 | service/1 | service/APL/1 | 4 | |
| ⋮ | ⋮ | ⋮ | ⋮ | ⋮ |

FIG.14

| CONTRACTOR NUMBER | APL NUMBER | CONTRACT | SERVER NUMBER | VIRTUAL MACHINE NUMBER |
|---|---|---|---|---|
| 1 | 1 | GUARANTEED | 1 | 1 |
| 1 | 1 | GUARANTEED | 1 | 2 |
| 1 | 1 | GUARANTEED | 1 | 3 |
| ⋮ | ⋮ | ⋮ | ⋮ | ⋮ |
| 2 | 2 | BEST EFFORT | 1 | 11 |
| 2 | 2 | BEST EFFORT | 1 | 12 |
| 1 | 1 | GUARANTEED | 1 | 4 |
| ⋮ | ⋮ | ⋮ | ⋮ | ⋮ |

FIG.15

| APL NUMBER | SERVER NUMBER | VIRTUAL MACHINE NUMBER |
|---|---|---|
| 1 | 1 | 1 |
|  | 1 | 2 |
|  | 1 | 3 |
| ⋮ | ⋮ | ⋮ |
| 2 | 1 | 11 |
|  | 1 | 12 |
| 1 | 1 | 4 |
| ⋮ | ⋮ | ⋮ |

FIG.16

MANAGEMENT SYSTEM AND METHOD FOR EXECUTION OF VIRTUAL MACHINES

CROSS-REFERENCE TO RELATED APPLICATIONS

This application is based upon and claims the benefit of priority of the prior Japanese Patent Application No. 2013-043955, filed on Mar. 6, 2013, the entire contents of which are incorporated herein by reference.

FIELD

This invention relates to a management technique for virtual machines.

BACKGROUND

A user who uses a cloud system may enter into a performance guarantee agreement for application programs that are used for the user's task. When there is a performance guarantee, it is requested to allocate a virtual machine so that the performance of an application program that is used for the user's task does not drop (for example, so that a response time of the application program is not equal to or greater than a predetermined time). On the other hand, when there is no performance guarantee, priority of allocation can be lowered, so a virtual machine can be allocated according to best effort or the like.

The following kind of technology is known for allocating virtual machines in a cloud system. More specifically, a load monitor that is provided in a server monitors a load of a service that is provided by the server. When a value of the load is greater than a first threshold, an activation unit that is provided in the server activates a new virtual machine. When the value of the load is less than a second threshold value, a virtual machine at work is stopped. By doing in this way, it is possible to deal with changes in the load of the service flexibly.

However, in the conventional technology described above, a performance guarantee of an application program is not considered. Therefore, when a load of a virtual machine has satisfied a certain condition, the virtual machine is eliminated regardless of whether or not performance is guaranteed. Therefore it may not be possible to maintain performance of an application program having a performance guarantee.

Patent Document 1: Japanese Laid-open Patent Publication No. 2012-37935

SUMMARY

A management system related to one mode of this invention includes an information processing apparatus that executes a plurality of processing entities, each of which relates to at least one of application programs that include a first application program whose performance is not guaranteed and a second application program whose performance is guaranteed; a management apparatus that manages a data storage unit that stores, in association with identification information of an application program, identification information of a processing entity that relates to the application program and information representing whether or not performance is guaranteed; and a load balancing apparatus that allocates processing to the plurality of processing entities. And the management apparatus includes a request unit that specifies a first processing entity that relates to the first application program by using the data storage unit, upon detecting that a value related to a load of the second processing entity that relates to the second application program is equal to or greater than a first predetermined threshold, and requests the information processing apparatus to stop the first processing entity, and the information processing apparatus includes a management unit that requests the load balancing apparatus to stop allocating processing to the first processing entity upon detecting that the request unit requested to stop the first processing entity, stops the first processing entity upon detecting that a value related to a load of the first processing entity is equal to or less than a second predetermined threshold, and causes a third processing entity included in the plurality of processing entities to start processing for the second application program.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5 is a diagram depicting an example of data stored in the measurement data storage unit;

FIG. 6 is a diagram depicting an example of data stored in the collected data storage unit;

FIG. 8 is a diagram depicting an example of data stored in the threshold storage unit;

FIG. 9 is a diagram depicting an example of data stored in the contract data storage unit;

FIG. 11 is a diagram depicting an example of data stored in the VM data storage unit;

FIG. 12 is a diagram depicting an example of data stored in the VM data storage unit;

FIG. 13 is a diagram depicting an example of allocation settings stored in the setting data storage unit;

FIG. 14 is a diagram depicting an example of data stored in the VM data storage unit;

FIG. 15 is a diagram depicting an example of data stored in the contract data storage unit;

FIG. 16 is a diagram depicting an example of allocation settings stored in the setting data storage unit;

DESCRIPTION OF EMBODIMENTS

Embodiment 1

Figure 1:
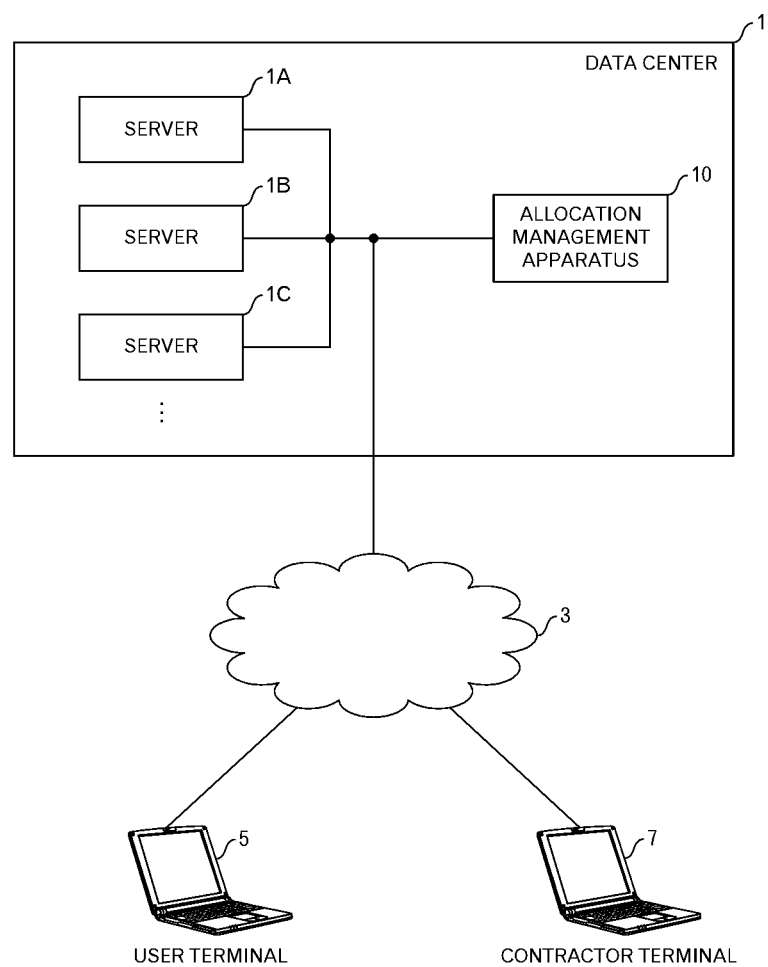
FIG. 1 is a diagram depicting a system outline of the first embodiment.

FIG. 1 illustrates a system of a first embodiment. A data center 1, a user terminal 5 and a contractor terminal 7 are connected to a network 3, which is, for example, the Internet. Servers 1A to 1C, which are physical servers, and an allocation management apparatus 10 are located in the data center 1. The servers 1A to 1C and the allocation management apparatus 10 are connected by a LAN (Local Area Network) cable and the like, so communication can be performed. The contractor (provider of a service in this embodiment) that operates the contractor terminal 7 provides the service of application programs that are executed by the servers 1A to 1C. A user of the service is a user that operates the user terminal 5. In FIG. 1, the number of the servers is three, however, the number is not limited.

Figure 2:
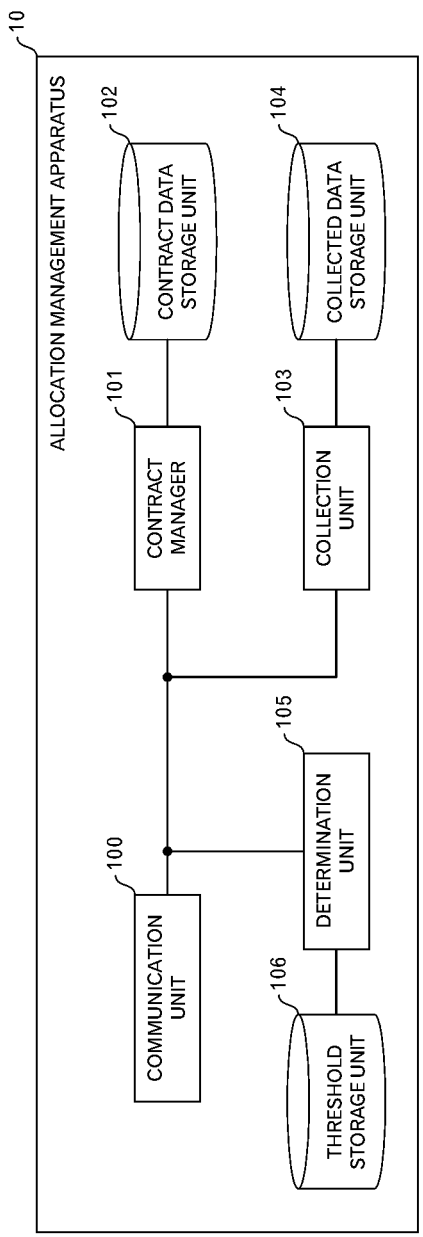
FIG. 2 is a functional block diagram of the allocation management apparatus.

FIG. 2 illustrates functional blocks of the allocation management apparatus 10. The allocation management apparatus 10 includes a communication unit 100, a contract manager 101, a contract data storage unit 102, a collection unit 103, a collected data storage unit 104, a determination unit 105 and a threshold storage unit 106.

The communication unit 100 executes processing for transmitting data to another apparatus, and for receiving data from another apparatus. The contract manager 101 manages data that is stored in the contract data storage unit 102. The collection unit 103 collects data related to loads of the virtual machines from servers 1A to 1C, and stores collected data in the collected data storage unit 104. The determination unit 105 uses data that is stored in the contract data storage unit 102, data stored in the collected data storage unit 104 and data stored in the threshold storage unit 106 to execute processing for determining a virtual machine to be stopped.

Figure 3:
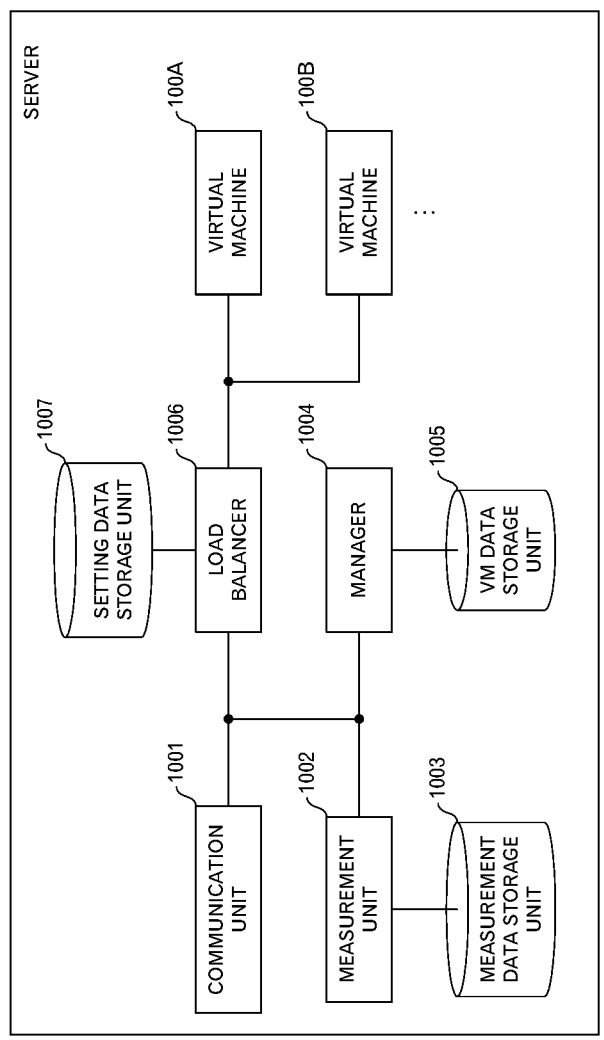
FIG. 3 is a functional block diagram of the server of the first embodiment.

FIG. 3 illustrates functional blocks of a server. A server includes a communication unit 1001, a measurement unit 1002, a measurement data storage unit 1003, a manager 1004, a VM (Virtual Machine) data storage unit 1005, a load balancer 1006, a setting data storage unit 1007, a virtual machine 100A and a virtual machine 100B. In FIG. 3, the number of the virtual machines is two, however, the number is not limited.

The communication unit 1001 executes processing for transmitting data to another apparatus, and for receiving data from another apparatus. The measurement unit 1002 measures data related to loads of the virtual machines 100A and 100B, and stores measured data in the measurement data storage unit 1003. The manager 1004 executes processing for managing data that is stored in the VM data storage unit 1005. The load balancer 1006 executes processing for allocating a processing request received from the user terminal 5 to the virtual machines 100A and 100B based on data that is stored in the setting data storage unit 1007. The virtual machines 100A and 100B execute an application program for performing processing related to a service.

Next, an operation of the system illustrated in FIG. 1 will be explained using FIG. 4 to FIG. 16. First, processing, performed by the allocation management apparatus 10, for collecting measured data from the servers 1A to 1C will be explained using FIG. 4 to FIG. 6.

The measurement unit 1002 of the servers 1A to 1C, for example, periodically measures data related to loads of the virtual machines 100A and 100B, and stores measured data in the measurement data storage unit 1003.

FIG. 5 illustrates an example of data that is stored in the measurement data storage unit 1003. In the example in FIG. 5, a server number, a virtual machine number, a measurement date, a CPU (Central Processing Unit) utilization rate, a memory utilization rate, and a response time are stored. In a column for the server number, a server number of a server that includes the measurement data storage unit 1003 is stored.

The measurement unit 1002, for example, periodically outputs data that is stored in the measurement data storage unit 1003 and is related to loads of virtual machines to the communication unit 1001. Accordingly, the communication unit 1001 transmits the data related to loads of the virtual machines to the allocation management apparatus 10. The measurement unit 1002, for example, outputs, for each of the virtual machines, the most recent data related to a load to the communication unit 1001.

Figure 4:
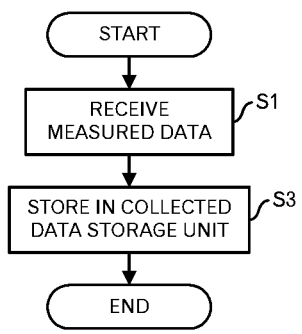
FIG. 4 is a diagram depicting a processing flow of processing for collecting measured data from servers.

The communication unit 100 of the allocation management apparatus 10 receives the data related to loads of virtual machines (FIG. 4: step S1). The communication unit 100 then outputs the data related to loads of virtual machines to the collection unit 103.

After receiving the data related to loads of virtual machines from the communication unit 100, the collection unit 103 stores the data in the collected data storage unit 104 (step S3).

FIG. 6 illustrates an example of data that is stored in the collected data storage unit 104. In the example in FIG. 6, a server number, a virtual machine number, CPU utilization rate, memory utilization rate and a response time are stored.

By executing processing such as described above, the allocation management apparatus 10 is able to know loads of virtual machines that are executed by the servers 1A to 1C.

Next, processing for adding a virtual machine when there are not enough virtual machines to execute application programs that have a performance guarantee will be explained using FIG. 7 to FIG. 16.

First, the determination unit 105 of the allocation management apparatus 10 acquires collected data (in other words, data that is stored in the collected data storage unit 104) from the collection unit 103, and acquires contract data (in other words, data that is stored in the contract data storage unit 102) from the contract manager 101. The determination unit 105 also reads out thresholds that are stored in the threshold storage unit 106.

FIG. 8 illustrates an example of data that is stored in the threshold storage unit 106. In the example in FIG. 8, thresholds of a CPU utilization rate, memory utilization rate, and a response time are stored. These thresholds are thresholds for determining whether or not a load of a virtual machine is high, and are set in advance by an administrator or the like.

FIG. 9 illustrates an example of contract data that is stored in the contract data storage unit 102. In the example in FIG. 9, a contractor number, an application program number (hereafter, abbreviated as APL number), information describing the contents of the contract, a server number, and a virtual machine number. For example, when the contract data is data illustrated in FIG. 9 and a virtual machine number of a detected virtual machine is "1", a server with a server number "1" is identified.

Figure 7:
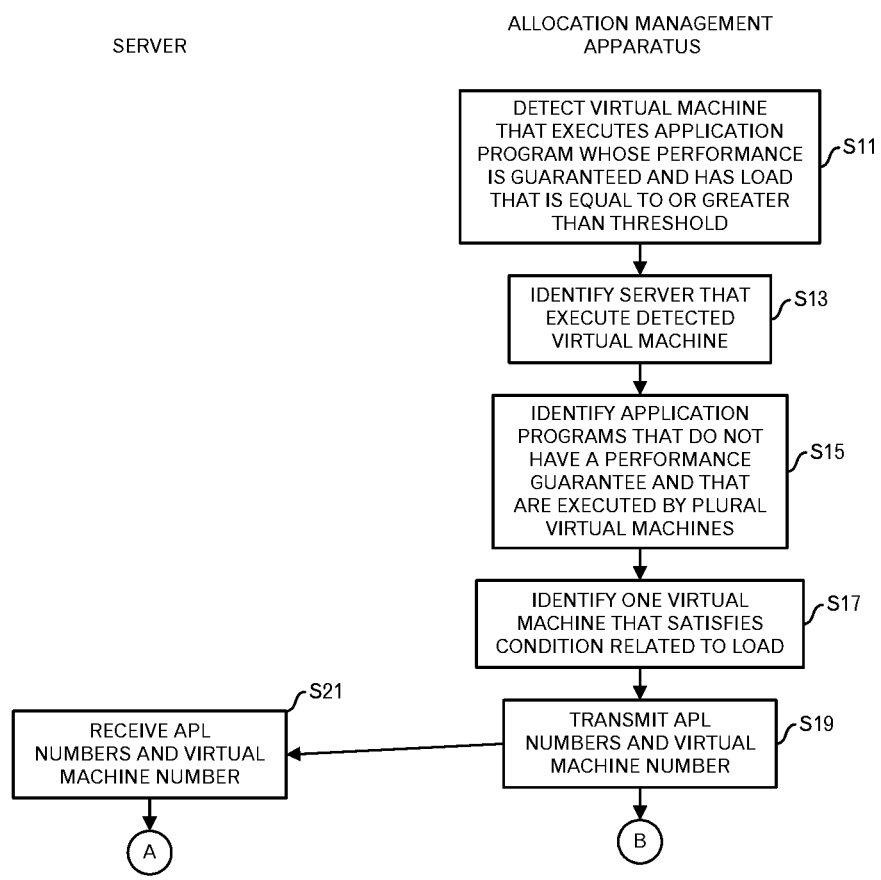
FIG. 7 is a diagram depicting a processing flow of processing for adding a virtual machine when virtual machines that execute an application program whose performance is guaranteed become insufficient.

The determination unit 105 identifies, from the contract data, virtual machines that execute application programs that have a performance guarantee. And, by comparing the data related to loads of virtual machines included in the collected data with the thresholds, the determination unit 105 also detects, from among the identified virtual machines, a virtual machine whose load is equal to or greater than the threshold (FIG. 7: step S11). For example, the determination unit 105 detects a virtual machine whose one of a CPU utilization rate, a memory utilization rate or a response time is equal to or greater than the threshold. In this embodiment, an application program that has a performance guarantee is an application program for which the contract is "guaranteed".

The determination unit 105 identifies a server that executes the identified virtual machine from the contract data (step S13).

From among application programs that are executed by the identified server, the determination unit 105 identifies, by using the contract data, an application program that does not has a performance guarantee and is executed by plural virtual machines (step S15). For example, when the identified server is a server in FIG. 9 that has server number "1", an application program that has APL number "2" is identified. In this embodiment, an application program that does not have a performance guarantee is an application program for which contract is "best effort".

The determination unit 105 identifies, from among the plural virtual machines that execute the identified application program, one virtual machine that satisfies a condition related to a load by using the collected data (step S17). A virtual machine that satisfies the condition related to a load is, for example, a virtual machine that has minimum CPU utilization rate, minimum memory utilization rate and minimum response time. For example, in step S15, when an application program with APL number "2" is identified and the collected data illustrated in FIG. 6 is stored in the collected data storage unit 104, a virtual machine with virtual machine number "13" is identified. The virtual machine that is identified in step S17 is a virtual machine that will be stopped.

The determination unit 105 transmits, to a server that executes the virtual machine to be stopped, an APL number of an application program that is executed by a virtual machine whose load is equal to or greater than the threshold and a virtual machine number of the virtual machine to be stopped by way of the communication unit 100 (step S19). For example, when a virtual machine that has a virtual machine number "13" is to be stopped, the determination unit 105 transmits the APL number and the virtual machine number to a server whose server number is "1".

The communication unit 1001 in the server (here, assume that this server is the server 1A) receives, from the allocation management apparatus 10, the APL number of the application program that is executed by the virtual machine whose load is equal to or greater than the threshold and the virtual machine number of the virtual machine to be stopped (step S21). The communication unit 1001 then outputs received data to the manager 1004. Processing then moves to processing in FIG. 10 by way of terminals A and B.

Figure 10:
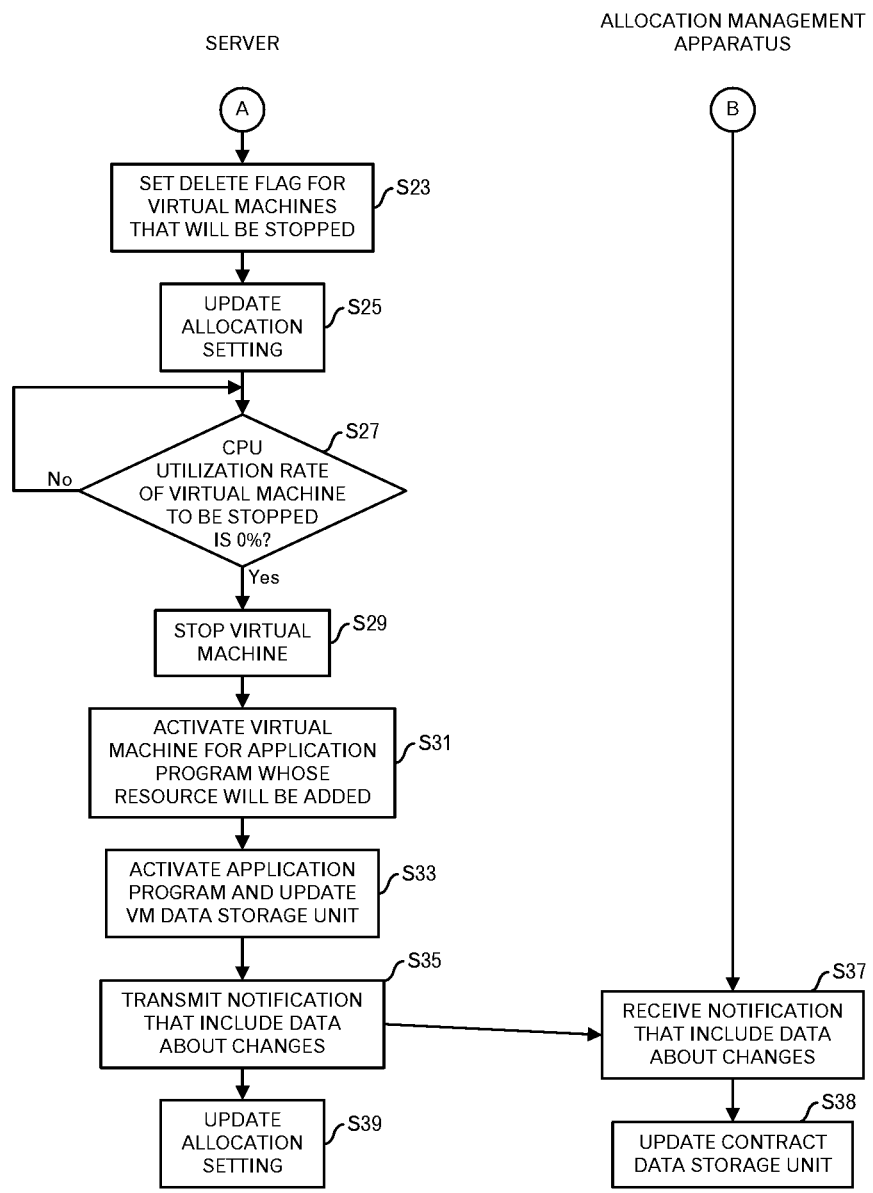
FIG. 10 is a diagram depicting a processing flow of processing for adding a virtual machine when virtual machines that execute an application program whose performance is guaranteed become insufficient.

Moving to an explanation of FIG. 10, the manager 1004 of the server 1A sets a delete flag in the VM data storage unit 1005 for a virtual machine whose virtual machine number is the virtual machine number included in the received data (FIG. 10: step S23).

FIG. 11 illustrates an example of data stored in the VM data storage unit 1005. In the example in FIG. 11, an APL number, a representative URI (Uniform Resource Identifier), storage location of an application program (hereafter, this will be abbreviated as APL location), a virtual machine number, and a delete flag are stored. The representative URI is a URI that is used when the user terminal 5 requests processing using the application program.

For example, when a delete flag is set for a virtual machine whose virtual machine number is "13", data illustrated in FIG. 11 is updated as illustrated in FIG. 12. In data illustrated in FIG. 12, "Delete" is set in a column for a delete flag in a row for the virtual machine whose virtual machine number is "13". A virtual machine for which a delete flag is set will be stopped.

Returning to the explanation of FIG. 10, the manager 1004 requests the load balancer 1006 to stop allocating processing to the virtual machine to be stopped. Accordingly, the load balancer 1006 updates allocation setting that is stored in the setting data storage unit 1007 so that allocation of processing to the virtual machine to be stopped is stopped (step S25).

FIG. 13 illustrates an example of allocation setting that is stored in the setting data storage unit 1007. In the example in FIG. 13, an APL number, a server number and a virtual machine number are stored. In the example in FIG. 13, a virtual machine number "13" is not stored for an application program that has an APL number "2", so processing is not allocated to a virtual machine that has the virtual machine number "13".

The load balancer 1006 notifies the manager 1004 that updating is finished. As a result, the manager 1004 determines whether a CPU utilization rate of the virtual machine to be stopped is 0% (step S27). In other words, the manager 1004 determines whether the virtual machine to be stopped is in an idle state. When the CPU utilization rate of the virtual machine to be stopped is not 0% (step S27: NO route), processing returns to processing of step S27.

On the other hand, when the CPU utilization rate of the virtual machine to be stopped is 0% (step S27: YES route), the manager 1004 stops the virtual machine whose CPU utilization rate is 0% (step S29).

The manager 1004 activates a virtual machine for an application program executed by a virtual machine whose load is equal to or greater than the threshold (step S31). In other words, a virtual machine is newly added to the server 1A. In step S31, the manager 1004 activates the virtual machine using, for example, a virtual machine image or the like.

The manager 1004 activates an application program that is to be executed by the activated virtual machine (in other words, an application program that is executed by a virtual machine whose load is equal to or greater than the threshold). Then, the manager 1004 updates data that is stored in the VM data storage unit 1005 (step S33). FIG. 14 illustrates an example of data that is stored in the VM data storage unit 1005 after step S33. When compared with data illustrated in FIG. 12, a virtual machine number "13" for which a delete flag was set is deleted, and a virtual machine number "4" is newly set. An APL number of an application program that is executed by a virtual machine that has a virtual machine number "4" is "1". In step S33, the manager 1004 uses data of APL location in the VM data storage unit 1005 to identify a storage location of an application program to be activated.

The manager 1004 outputs data about changes that includes a virtual machine number of the stopped virtual machine to the communication unit 1001, an APL number of an application program executed by the stopped virtual machine, a server number of a server that executed the stopped virtual machine, a virtual machine number of the added virtual machine, an APL number of an application program that is executed by the added virtual machine, and a server number of a server that executes the added virtual machine. The communication unit 1001 transmits a notification that includes the data about changes to the allocation management apparatus 10 (step S35).

The communication unit 100 of the allocation management apparatus 10 receives, from the server 1A, the notification that includes the data about changes (step S37). The communication unit 100 outputs the notification that Includes the data about changes to the contract manager 101.

The contract manager 101 updates the contract data storage unit 102 based on the data about changes (step S38). For example, when contract data illustrated in FIG. 9 is updated, the contract data becomes as illustrated in FIG. 15. In other words, the contract manager 101 replaces a virtual machine number of the stopped virtual machine with a virtual machine number of the added virtual machine, and replaces an APL number of an application program executed by the stopped virtual machine with an APL number of an application program executed by the added virtual machine. Moreover, the contract manager 101, together with changing contract from "best effort" to "guaranteed", changes a contractor number from a contractor number of a contractor for an application program previously executed to a contractor number of a contractor for an application program newly executed.

The manager 1004 of the server 1A requests the load balancer 1006 to start allocating processing to the added virtual machine. As a result, the load balancer 1006 updates allocation setting stored in the setting data storage unit 1007 so that allocation of processing to the added virtual machine is started (step S39). For example, when allocation setting illustrated in FIG. 13 is updated, the allocation setting becomes as illustrated in FIG. 16. More specifically, a virtual machine that has a virtual machine number "4" is added as a virtual machine that executes an application program that has an APL number "1".

As described above, a virtual machine is newly added even if loads of virtual machines that execute application programs that have a performance guarantee become high. As a result, it becomes possible to maintain performance of application programs that have a performance guarantee.

Moreover, although a virtual machine that executes an application program that does not have a performance guarantee is stopped, only one virtual machine of plural virtual machines is stopped. Therefore, it is possible to suppress influence on execution of the application program.

Furthermore, a virtual machine having a low processing load (in other words, a virtual machine that is currently performing little processing) is stopped, so it is possible to immediately stop the virtual machine.

Embodiment 2

In the first embodiment, each of the servers 1A to 1C has the load balancer 1006 that executes processing for balancing the loads. In this second embodiment, an example is explained in which a load balancing apparatus 11 that executes processing for balancing loads is provided separate from the servers 1A to 1C.

Figure 17:
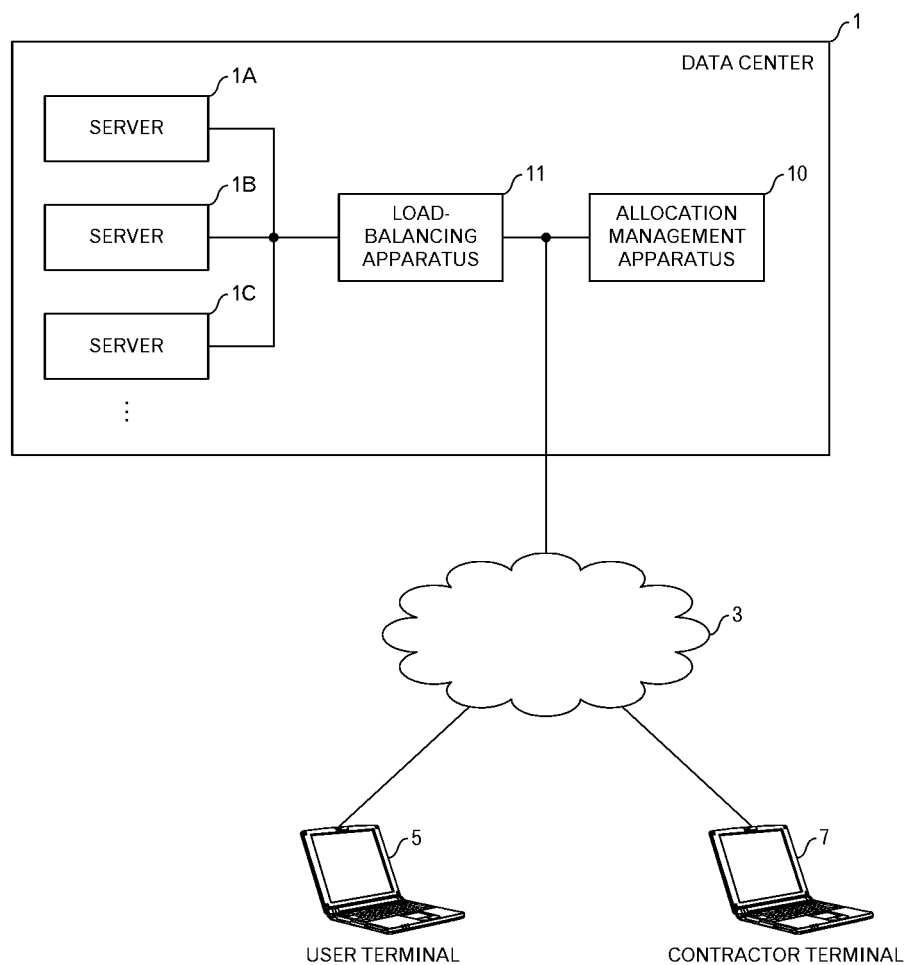
FIG. 17 is a diagram depicting a system outline of the second embodiment.

FIG. 17 illustrates a system of this second embodiment. For example, a data center 1, a user terminal 5 and a contractor terminal 7 are connected to a network 3, which is, for example, the Internet. Servers 1A to 1C, which are physical servers, an allocation management apparatus 10, and a load balancing apparatus 11 are arranged at the data center 1. The servers 1A to 1C are connected to the load balancing apparatus 11 and allocation management apparatus 10 by way of a LAN cable and the like. A contractor (in this example, a service provider) that operates the contractor terminal 7 provides a service of application programs that are executed by the servers 1A to 1C. A user of the service is a user of the user terminal 5. In FIG. 17 the number of the servers is three, however, the number is not limited.

Figure 18:
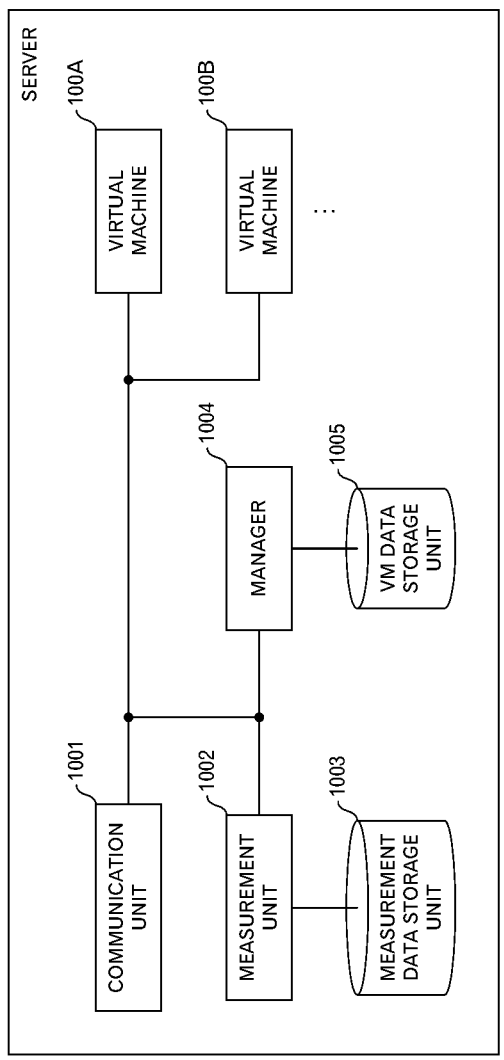
FIG. 18 is a functional block diagram of the server of the second embodiment.

FIG. 18 illustrates functional blocks of a server of this second embodiment. A server includes a communication unit 1001, a measurement unit 1002, a measurement data storage unit 1003, a manager 1004, a VM data storage unit 1005, a virtual machine 100A and a virtual machine 100B. In FIG. 18, the number of the virtual machines is two, however, the number is not limited. A server of this second embodiment differs from a server of the first embodiment in that there is no load balancer 1006 and setting data storage unit 1007.

Figure 19:
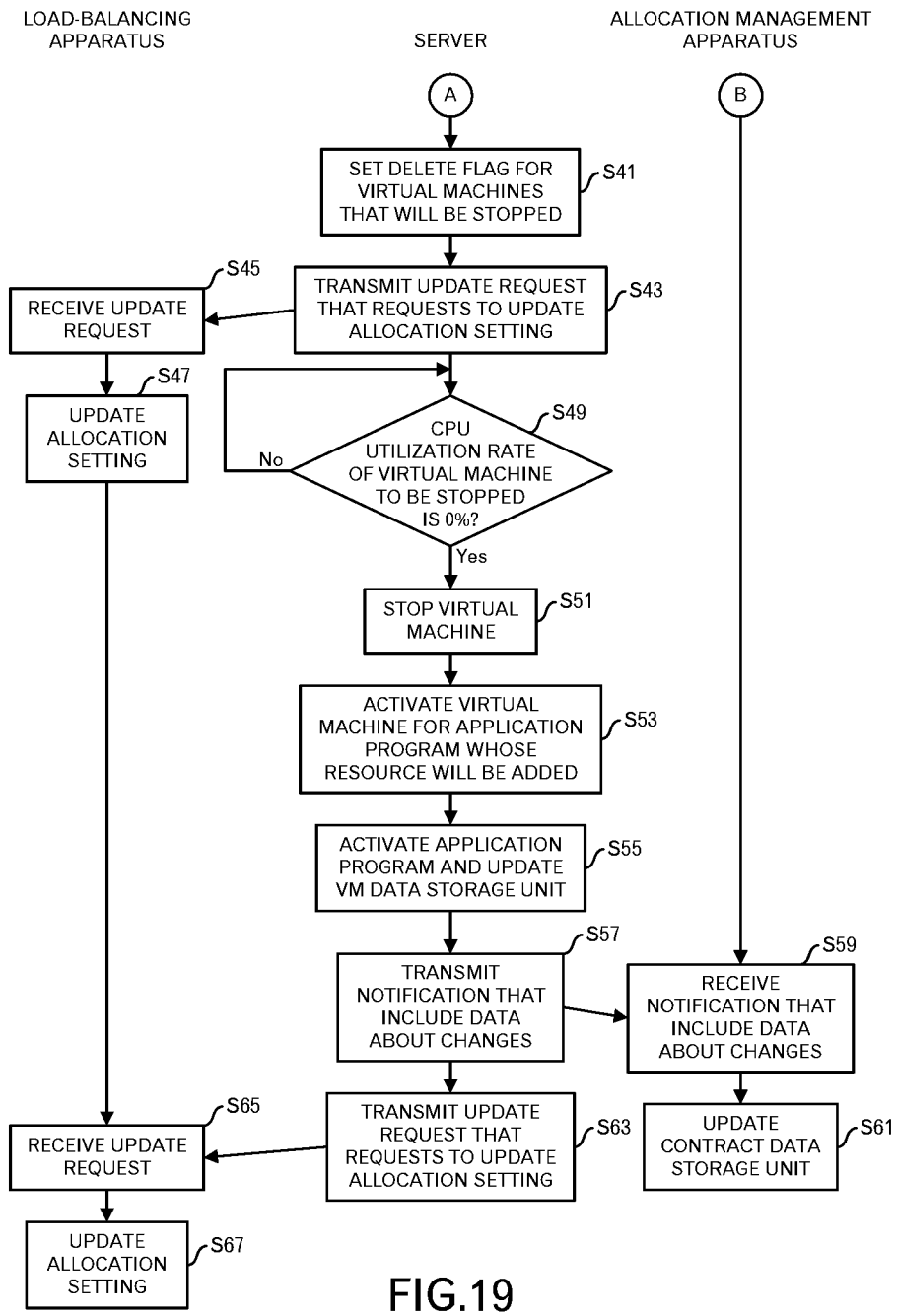
FIG. 19 is a diagram depicting a processing flow of processing for adding a virtual machine when virtual machines that execute an application program whose performance is guaranteed become insufficient.

Next, FIG. 19 will be used to explain processing from terminals A and B. In this second embodiment, there is a load balancing apparatus 11, so the processing from terminals A and B is different from that of the first embodiment.

First, the manager 1004 of the server 1A sets a delete flag in the VM data storage unit 1005 for a virtual machine whose virtual machine number is the virtual machine number included in the received data (FIG. 19: step S41).

The manager 1004 transmits an update request for updating allocation setting (here, this is a request to stop allocation of processing to a virtual machine to be stopped) to the load balancing apparatus 11 (step S43).

The load balancing apparatus 11 receives the update request for updating the allocation setting (step S45). The load balancing apparatus 11 then updates the allocation setting so that allocation of processing to the virtual machine to be stopped is stopped.

The manager 1004 of the server 1A determines whether CPU utilization rate of the virtual machine to be stopped is 0% (step S49). In other words, the manager 1004 determines whether the virtual machine to be stopped is in an idle state. When the CPU utilization rate of the virtual machine to be stopped is not 0% (step S49: NO route), processing returns to the processing of step S49.

On the other hand, when the CPU utilization rate of the virtual machine to be stopped is 0% (step S49: YES route), the manager 1004 stops the virtual machine whose CPU utilization late is 0% (step S51).

The manager 1004 then activates a virtual machine for an application program executed by a virtual machine whose load is equal to or greater than the threshold (step S53). In other words, a virtual machine is newly added to the server 1A. In step S53, the manager 1004 activates the virtual machine using, for example, a virtual machine image or the like.

The manager 1004 activates an application program that is to be executed by the activated virtual machine (in other words, an application program that is executed by a virtual machine whose load is equal to or greater than the threshold). Then, the manager 1004 updates data that is stored in the VM data storage unit 1005 (step S55).

The manager 1004 outputs data about changes that includes a virtual machine number of the stopped virtual machine to the communication unit 1001, an APL number of an application program executed by the stopped virtual machine, a server number of a server that executed the stopped virtual machine, a virtual machine number of the added virtual machine, an APL number of an application program that is executed by the added virtual machine, and a server number of a server that executes the added virtual machine. The communication unit 1001 transmits a notification that includes the data about changes to the allocation management apparatus 10 (step S57).

The communication unit 100 of the allocation management apparatus 10 receives, from the server 1A, the notification that includes the data about changes (step S59). The communication unit 100 outputs the notification that includes the data about changes to the contract manager 101.

The contract manager 101 updates the contract data storage unit 102 based on the data about changes (step S61).

The manager 1004 of the server 1A transmits an update request for updating the allocation setting (here, this is a start request to start allocation of processing to the added virtual machine) to the load balancing apparatus 11 (step S63).

The load balancing apparatus 11 receives the update request (step S65). Then, the load balancing apparatus 11 updates the allocation setting so that allocation of processing to the added virtual machine starts (step S67).

As described above, even when a load balancing apparatus 11 that has a load balancing function is provided separate from the servers 1A to 1C, it is possible to suitably stop a virtual machine and add a virtual machine by working with the load balancing apparatus 11.

Embodiment 3

In the first and second embodiments, examples were explained in which application programs are executed by virtual machines. In this third embodiment, an example in which the servers 1A to 1C directly execute application programs without executing virtual machines is explained.

Figure 20:
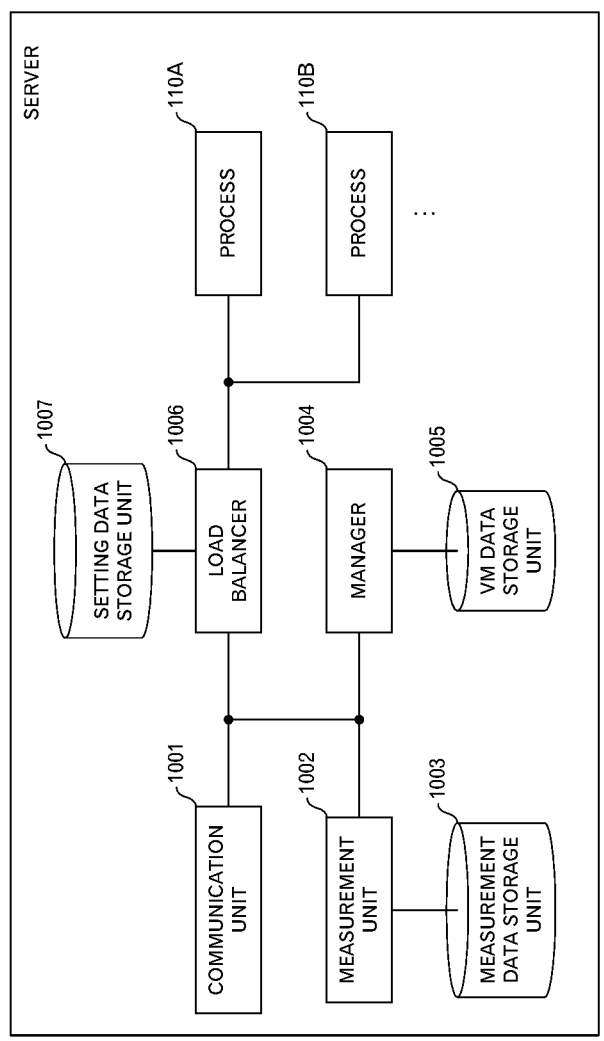
FIG. 20 is a functional block diagram of the server of the third embodiment.

FIG. 20 illustrates functional blocks of a server of this third embodiment. A server includes a communication unit 1001, a measurement unit 1002, a measurement data storage unit 1003, a manager 1004, a VM data storage unit 1005, a load balancer 1006, a setting data storage unit 1007, a process 110A and a process 110B. In FIG. 20 the number of processes is two, however, the number is not limited.

As described above, the same processing as in the first embodiment can be performed for the processes of application programs not for virtual machines.

Although the embodiments of this invention were explained, this invention is not limited to the embodiments. For example, the functional block configurations of the aforementioned allocation management apparatus 10 and the servers 1A to 1C may not always correspond to program module configurations.

Moreover, the aforementioned table configurations of the respective tables are mere examples, and may be modified. Furthermore, as for the processing flow, as long as the processing results do not change, the turns of the steps may be exchanged or the steps may be executed in parallel.

In addition, in an example described above, the servers 1A to 1C use the most recent data related to a load of a virtual machine. However, the servers 1A to 1C may use data related to an average load in the most recent predetermined time period.

Furthermore, when a virtual machine, whose value of a load is equal to or greater than a threshold, executes plural application programs, a virtual machine may be added for at least one of the plural application programs.

Figure 21:
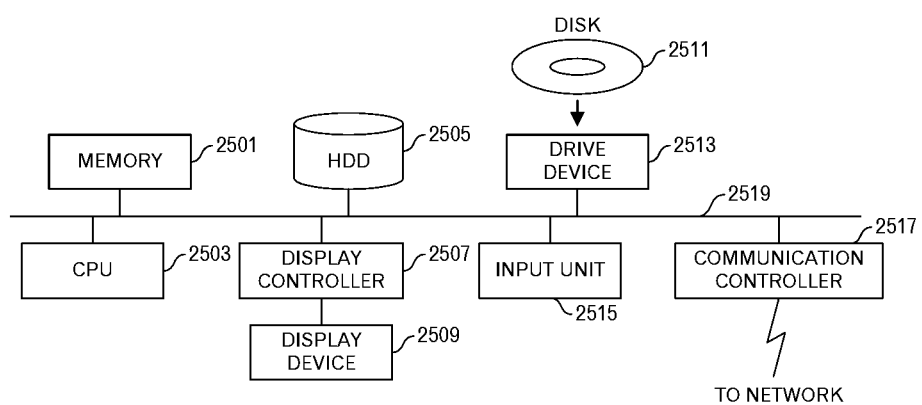
FIG. 21 is a functional block diagram of a computer.

In addition, the aforementioned allocation management apparatus 10, load balancing apparatus 11 and servers 1A to 1C are computer device as illustrated in FIG. 21. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrates in FIG. 21. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The embodiments described above are summarized as follows:

A management system related to the first aspect of the embodiments includes (A) an information processing apparatus that executes plural processing entities (for example, virtual machines or processes in the embodiments), each of which relates to at least one of application programs that include a first application program whose performance is not guaranteed and a second application program whose performance is guaranteed; (B) a management apparatus that manages a data storage unit that stores, in association with identification information of an application program, identification information of a processing entity that relates to the application program and information representing whether or not performance is guaranteed; and (C) a load balancing apparatus that allocates processing to the plural processing entities. And the management apparatus includes (b1) a request unit that specifies a first processing entity that relates to the first application program by using the data storage unit, upon detecting that a value related to a load of the second processing entity that relates to the second application program is equal to or greater than a first predetermined threshold, and requests the information processing apparatus to stop the first processing entity, and the information processing apparatus includes (a1) a management unit that requests the load balancing apparatus to stop allocating processing to the first processing entity upon detecting that the request unit requested to stop the first processing entity, stops the first processing entity upon detecting that a value related to a load of the first processing entity is equal to or less than a second predetermined threshold, and causes a third processing entity included in the plural processing entities to start processing for the second application program.

By employing the aforementioned configuration, it becomes possible to maintain performance of an application program that has a performance guarantee, because a virtual machine is newly added even if a load of a virtual machine that executes an application program that has performance guarantee becomes high.

Furthermore, the first application program may relate to second plural processing entities among the plural processing entities, and the request unit may (b11) specify the first processing entity from among the second plural processing entities. By employing the aforementioned configuration, it becomes possible to avoid running short of a processing entity that relates to an application program whose performance is not guaranteed.

Furthermore, the load balancing apparatus may stop allocating processing to the first processing entity, upon detecting that the management unit requested the load balancing apparatus to stop allocating processing to the first processing entity. By employing the aforementioned configuration, it becomes possible for the first processing entity to avoid executing new processing.

Furthermore, the management apparatus may further include (b2) a collection unit that collects values related to loads of the plural processing entities from the information processing apparatus. By employing the aforementioned configuration, it becomes possible for the management apparatus to manage the plural processing entities.

Furthermore, the request unit may specify the first processing entity whose value related to a load is the least, from among the second plural processing entities. By employing the aforementioned configuration, it becomes possible to activate the third processing entity immediately.

Furthermore, the plural processing entities are virtual machines.

A management method related to the second aspect of the embodiments includes (D) detecting, by a management apparatus, that a value related to a load of a first processing entity that relates to a first application program is equal to or greater than a first predetermined threshold, wherein an information processing apparatus executes plural processing entities, each of which relates to at least one of application programs that include the first application program whose performance is guaranteed and a second application program whose performance is not guaranteed; (E) specifying, by the management apparatus, a second processing entity that relates to the second application program by using a data storage unit that stores, in association with identification information of an application program, identification information of a processing entity that relates to the application program and information representing whether or not performance is guaranteed; (F) requesting, by the management apparatus, the information processing apparatus to stop the second processing entity; (G) requesting, by the information processing apparatus, a load balancing apparatus to stop allocating processing to the second processing entity, upon detecting that the management apparatus requested to stop the second processing entity; (H) stopping, by the information processing apparatus, the second processing entity, upon detecting that a value related to a load of the second processing entity is equal to or less than a second predetermined threshold; and (I) causing, by the information processing apparatus, a third processing entity included in the plural processing entities to start processing for the first application program.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A management system, comprising:
an information processing apparatus;
a management apparatus; and
a load balancing apparatus, and wherein the information processing apparatus comprises:
a first memory; and
a first processor coupled to the first memory and configured to execute a plurality of virtual machines, each of which executes at least one of a first application program whose performance is not guaranteed and a second application program whose performance is guaranteed,
the management apparatus comprises:
a second memory; and
a second processor coupled to the second memory and configured to:
manage a data storage unit storing, in association with identification information of an application program, identification information of a virtual machine that executes the application program and information representing whether performance is guaranteed;
specify, by using the data storage unit, a first virtual machine from among virtual machines that are included in the plurality of virtual machines and execute the first application program whose performance is not guaranteed, upon detecting that a value related to a load of a second virtual machine that executes the second application program whose performance is guaranteed is equal to or greater than a first predetermined threshold; and
request the information processing apparatus to stop the first virtual machine;
the load balancing apparatus comprises:
a third memory; and
a third processor coupled to the third memory and configured to allocate processing to the plurality of virtual machines, and
the first processor is further configured to request the load balancing apparatus to stop allocating processing to the first virtual machine upon detecting that the second processor requested to stop the first virtual machine;
stop the first virtual machine upon detecting that a value related to a load of the first virtual machine is equal to or less than a second predetermined threshold; and
cause a third virtual machine included in the plurality of virtual machines to start processing for the second application program.

2. The management system as set forth in claim 1, wherein the third processor is further configured to stop allocating processing to the first virtual machine, upon detecting that the first processor requested the load balancing apparatus to stop allocating processing to the first virtual machine.

3. The management system as set forth in claim 1, wherein the second processor is further configured to collect values related to loads of the plurality of virtual machines from the information processing apparatus.

4. The management system as set forth in claim 1, wherein the second processor is further configured to specify the first virtual machine whose value related to a load is the least, from among the plural virtual machines that are included in the plurality of virtual machines and execute the first application program whose performance is not guaranteed.

5. A management method, comprising:

detecting, by a management apparatus, that a value related to a load of a first virtual machine that executes a first application program is equal to or greater than a first predetermined threshold, wherein an information processing apparatus configured to execute a plurality of virtual machines, each of which executes at least one of the first application program whose performance is guaranteed and a second application program whose performance is not guaranteed;

specifying, by the management apparatus, a second virtual machine from among virtual machines that are included in the plurality of virtual machines and execute the second application program whose performance is not guaranteed, by using a data storage unit storing, in association with identification information of an application program, identification information of a virtual machine that executes the application program and information representing whether performance is guaranteed;

requesting, by the management apparatus, the information processing apparatus to stop the second virtual machine;

requesting, by the information processing apparatus, a load balancing apparatus to stop allocating processing to the second virtual machine, upon detecting that the management apparatus requested to stop the second virtual machine;

stopping, by the information processing apparatus, the second virtual machine, upon detecting that a value related to a load of the second virtual machine is equal to or less than a second predetermined threshold; and causing, by the information processing apparatus, a third virtual machine included in the plurality of virtual machines to start processing for the first application program.

6. A computer-readable, non-transitory storage medium storing a program that causes a computer to execute a process, the process comprising:

detecting that a value related to a load of a first virtual machine that executes a first application program is equal to or greater than a first predetermined threshold, wherein an information processing apparatus is configured to execute a plurality of virtual machines, each of which executes at least one of the first application program whose performance is guaranteed and a second application program whose performance is not guaranteed;

specifying a second virtual machine from among virtual machines that are included in the plurality of virtual machines and execute the second application program whose performance is not guaranteed, by using a data storage unit storing, in association with identification information of an application program, identification information of a virtual machine that executes the application program and information representing whether or not performance is guaranteed; and requesting the information processing apparatus to stop the second virtual machine.

* * * * *